United States Patent [19]
Zipin et al.

[11] 3,991,477
[45] Nov. 16, 1976

[54] PROBE FOR A COORDINATE MEASURING MACHINE

[75] Inventors: Richard B. Zipin, Dayton; John E. Hart, Kettering; John W. Grass, Middletown, all of Ohio

[73] Assignee: The Bendix Corporation, Southfield, Mich.

[22] Filed: July 22, 1975

[21] Appl. No.: 598,512

[52] U.S. Cl. .............................. 33/172 E; 33/174 L; 33/125 C; 356/169; 250/224
[51] Int. Cl.² ......................................... G01B 7/31
[58] Field of Search ............... 33/172 E, 174 L, 1 L, 33/125 A, 125 C, 1 M, 174 R; 356/169, 170; 250/237 G, 224

[56] References Cited
UNITED STATES PATENTS

| | | |
|---|---|---|
| 2,886,717 | 5/1959 | Williamson et al. ................ 250/224 |
| 3,184,600 | 5/1965 | Potter ................................. 356/169 |
| 3,916,528 | 11/1975 | Eisenkopf ......................... 33/125 C |

*Primary Examiner*—Richard E. Aegerter
*Assistant Examiner*—Willis Little
*Attorney, Agent, or Firm*—John R. Benefiel

[57] ABSTRACT

A probe assembly is disclosed carrying a grid grating and an index grating adapted to generate a Moire pattern upon relative movement in either or both of two orthogonal directions in a common plane. The index and grid gratings are supported for precise orthogonal motion with respect to each other by means of a pair of grating support assemblies mounted so that the correct index and grid grating spacing and orientation are precisely maintained, including a cross-slide assembly provided to allow movement in a plane while maintaining the proper orientation between the grating assemblies.

4 Claims, 8 Drawing Figures

PROBE FOR A COORDINATE MEASURING MACHINE

BACKGROUND OF THE INVENTION

1. Field of the Invention

This invention concerns probes for coordinate measuring machines, particularly probes incorporating displacement tranducers of the electrooptic type in which optical gratings are utilized to generate an interference pattern (known as a Moire fringe) which shifts with relative movement between the two gratings in order to provide a probe which is capable of limited movement in a plane, which movement is detected by the probe transducer itself.

2. Description of the Prior Art

More fringe displacement tranducing arrangements as described in U.S. Pat. Nos. 2,886,717 and 2,886,718 and as described above have for various reasons enjoyed considerable success in the context of coordinate measuring machines, such as disclosed in U.S. Pat. Nos. 3,774,311; 3,757,423; and 3,403,448. These machines have usually taken the form of a probe shaft supported for linear movement along a first (Z) axis, the probe shaft support being supported for linear movement along a second (Y) axis orthogonal to the first axis on a carriage which is in turn supported for movement along a third (X) axis orthogonal to the first and second axes.

Movement along each axis is detected by means of a Moire fringe transducer, i.e., a scale grating is affixed to each of the supporting members aligned with movement therealong and an index price is carried by the member suported and positioned so as to produce the Moire fringe described.

For various reasons known to those skilled in this art, it is often desirable for the probe shaft to support a probe which is capable of limited detected movement in the plane orthogonal to its axis independently of the means of movement comprised by the supporting structure described above.

While it would be advantageous to detect such movement by a similar Moire fringe transducer means carried within the probe since the signals produced would be directly useable by existing system electronics, an arrangement has not heretofore been provided which was sufficiently compact to be carried within the confines of the probe.

For example, the two-axis transducer arrangement shown in U.S. Pat. No. 3,184,600 while producing a pulse type output upon movement of a probe in a plane utilizes a relatively bulky mechanical linkage to maintain proper orientation of the axes, which approach would not be feasible in this context. In addition, the effective control by this linkage in precisely maintaining the orientation of the grid and the index piece carried by the probe is difficult to achieve.

Also, the proper orientation and spacing of the index and scale gratings may be distributed upon bumping or dropping of the probe in this arrangement.

Finally, the bearing system for such arrangements must be quite friction-free since frictional drag produces slight structural deflections causing errors in measurement.

Accordingly, it is an object of the present invention to provide an arrangement for supporting the index and grid grating for movement in a plane which is frictionless and sufficiently compact for application in such probes and will precisely maintain the proper orientation and spacing therebetween notwithstanding the imposition of inadvertent excessive loadings on the probe tip tending to affect the grating alignments.

SUMMARY OF THE INVENTION

This object and others which will become apparent upon a reading of the following specification and claims is accomplished according to the present invention by a probe assembly carrying a grid grating and an index grating adapted to generate a Moire pattern upon relative movement in either or both of two orthgonal directions in a common plane.

The index and grid gratings are supported for precise orthogonal motion with respect to each other by means of a pair of grating support assemblies mounted so that the correct index and grid grating spacing and orientaton are precisely maintained, including a cross slide assembly provided to allow movement in a plane while maintaining the proper orientation between the grating assemblies.

A probe tip assembly is supported for fricton-free parallel movement by a ball bearing and thrust plate arrangement and is coupled to one of the grating support assemblies by a ball and groove connector to prevent the transmission of any axial loads to the transducer and also of any substantial torque loads tending to misalign the gratings.

DETAILED DESCRIPTION

Figures 1, 2:
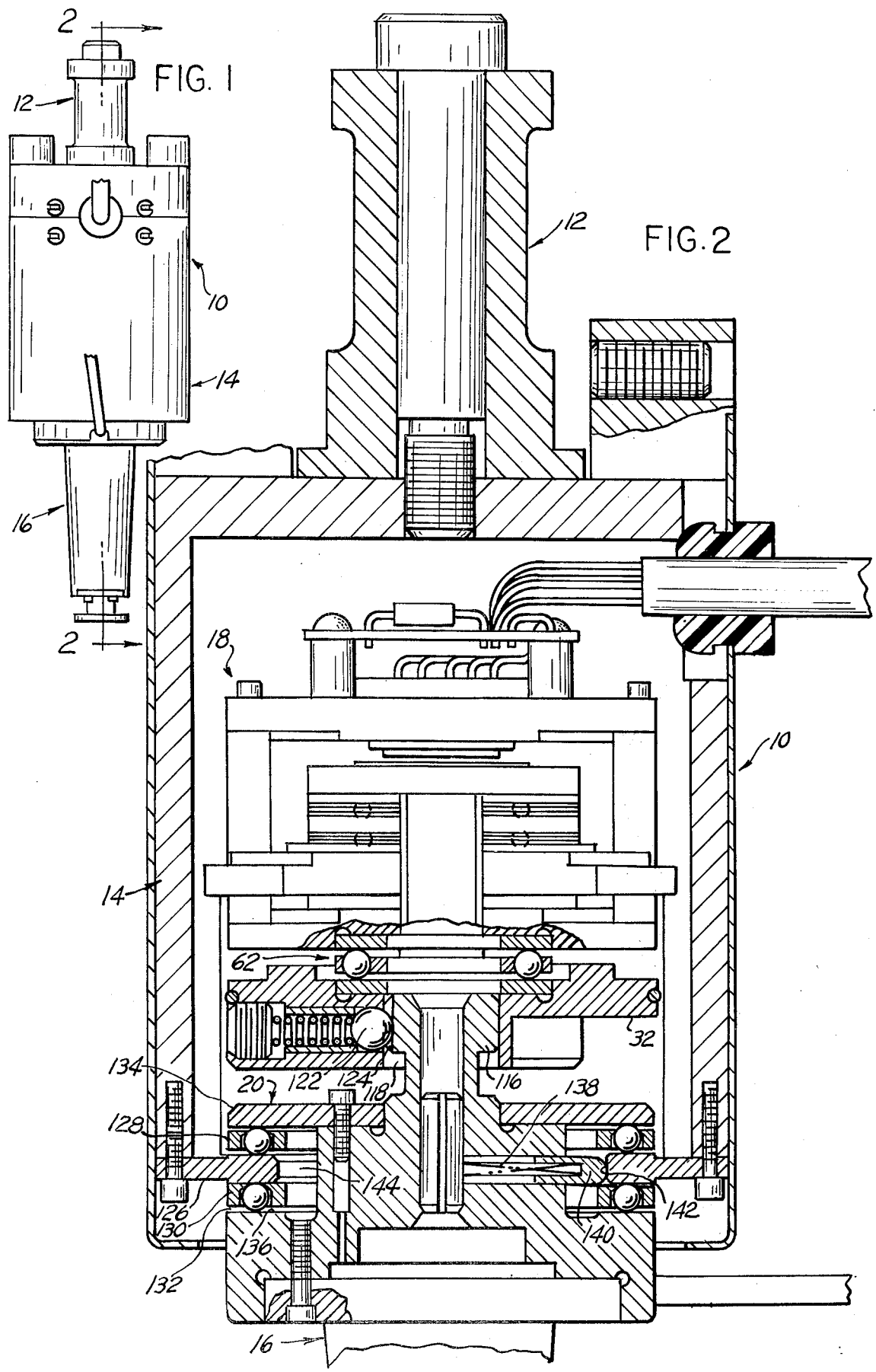
FIG. 1 is a front elevational view of the probe assembly according to the present invention.
FIG. 2 is an enlarged partial sectional view of the probe assembly depicted in FIG. 1, the section taken along the line 2—2 in FIG. 1.
Figure 3:
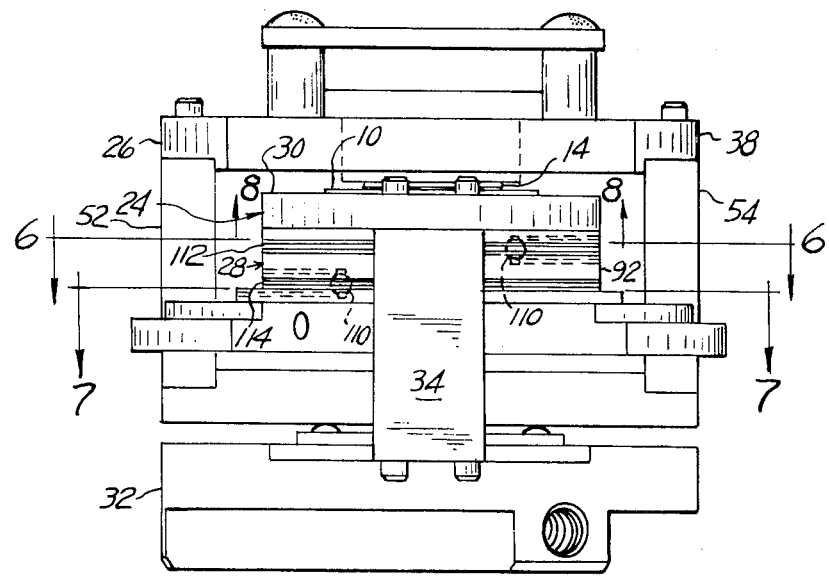
FIG. 3 is an elevational view of the two-axis transducer incorporated in the probe assembly shown in FIG. 2.
Figure 4:
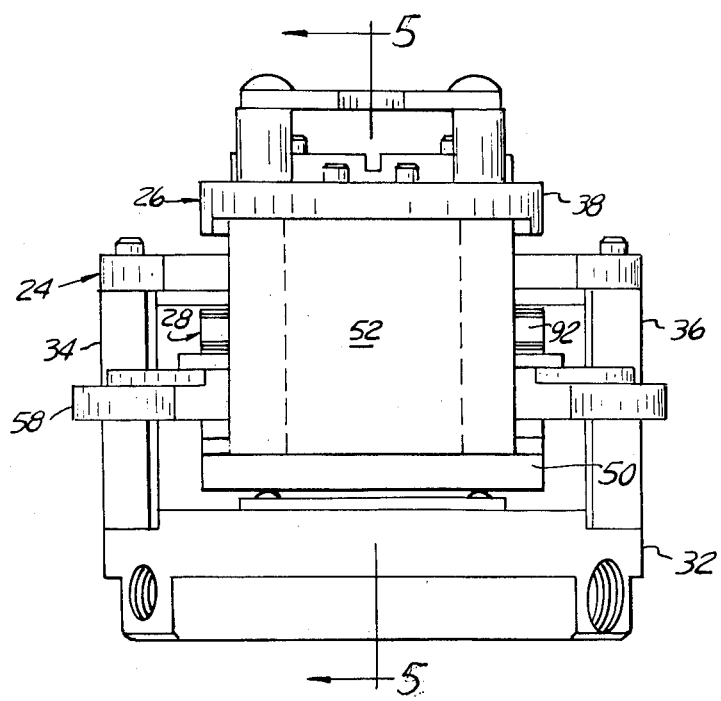
FIG. 4 is a side elevational view of the transducer embodiment shown in FIG. 3.

Referring to the Drawings, FIG. 1 depicts the probe 10 which includes a stem portion 12, adapted to be affixed in the probe shaft of the coordinate measuring machine (not shown), as well as a probe housing 14 containing the two-axis transducer to be described herein. A probe tip assembly 16 is also included, adapted to move over a small range relative to the rest of the probe 10 and generate signals corresponding thereto while engaging the workpiece by means of any of various replaceable probe tips (not shown), adapted to the particular inspection task.

FIG. 2 shows in partial section a portion of the probe tip, including a two-axis transducer assembly 18 supported within the probe housing 14 and coupled to the probe tip assembly 16 by means of a coupling assembly 20, also affixed to the probe housing 14.

Referring to FIGS. 3–8, the two-axis transducer 18 depicted in FIG. 2 is shown apart from the probe 10 for the purpose of providing a clearer description thereof.

The basic principle of this two-axis transducer assembly is described in U.S. Patent No. 3,957,378 assigned to the same assignee as the present application. This includes the use of a pair of optical gratings, an index grating 21, and a grid grating 22, which are affixed to structures which are capable of limited relative movement in parallel planes normal to the probe axis; this limited motion being constrained such that the relative orientation of the structures remains fixed in a position that Moire fringe patterns are produced corresponding to movement in orthogonal directions in the plane of movement, which patterns are detected and electrical signals generated corresponding thereto.

As more fully discussed in the above-identified application, the proper support of the index and grid grating so as to maintain the correct orientation of the index and grid grating is a critical element of this device, and such a support arrangement is the subject of one aspect of the present invention.

This arrangement consists of a grid support structure 24 and an index support structure 26. Grid support structure 24 includes a pair of spaced grid members, i.e., a grid holder plate 30 and a grid cap member 32, connected together by means of grid post elements 34 and 36 extending therebetween and secured to both members.

The index support structure 26 similarly includes a pair of spaced index members, i.e., index plate 38 and index pivot plate 50 connected together by means of a pair of index post elements 52 and 54 extending therebetween and fastened to both members. As can be seen by reference to these drawings, one of each of the grid and index members are interposed between the other pair of the grid or index members, that is, grid holder plate 30 is disposed between the index plate 38 and the index pivot plate 50, while index pivot plate 50 is disposed between the grid holder plate 30 and the grid cap member 32 so that the grid support structure 24 and the index support structure 26 are effectively linked together by the respective post elements.

The grid and index gratings 21 and 22 are affixed to respective opposing surfaces on a respective one of the interposed grid members, i.e., grid holder plate 30 and a respective one of the non-interposed index members, i.e., index plate 38 to which is affixed the index grating holder 40, so as to be in proper juxta-position to each other to produce the interference pattern.

A photodetector assembly 42 is also carried by the index grating holder 40, positioned and adapted to detect the fringe pattern and transmit corresponding electrical signals via a cable assembly 44 to power supply and signal processing circuitry 46 prior to being transmitted to the measuring machine electronics and display 48. Index pivot plate 50 carries a light source assembly 56 positioned to illuminate the index and grid gratings 20 and 22 respectively in the known manner, which assembly is powered by the cable assembly 44 in connection with the power supply and signal processing circuitry 46.

Support for the assemblage within the probe housing 14 is provided by a grid V-bridge member 58 extending between the interposed grid and index members, i.e., grid holder plate 30 and index pivot plate 50 secured to be stationary with respect to said probe housing 14 by means of four radiused protuberances 64, 66, 68 and 70 which are adapted to be received within slots 71 of probe housing 14 and fixed therein by cap screw 73.

Figure 5:
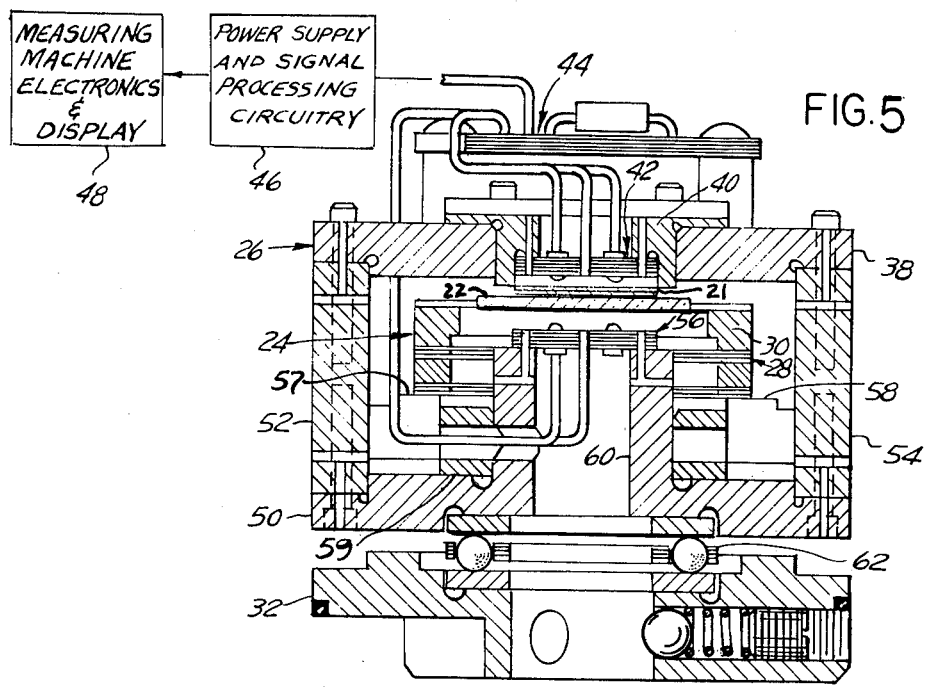
FIG. 5 is a view of the section 5—5 taken in FIG. 4
Figure 6:
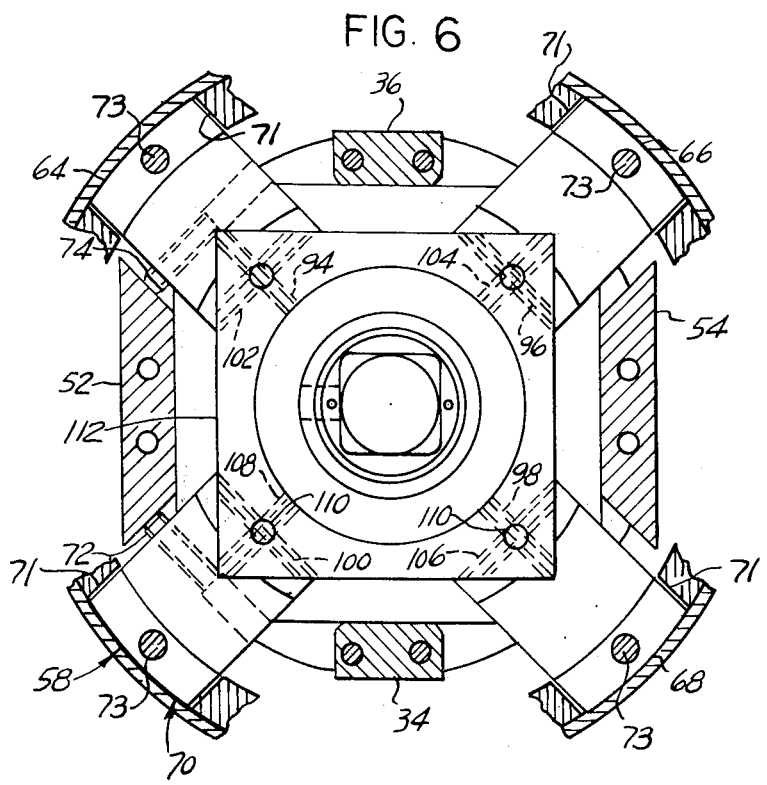
FIG. 6 is a view of the section 6—6 taken in FIG. 3.
Figure 7:
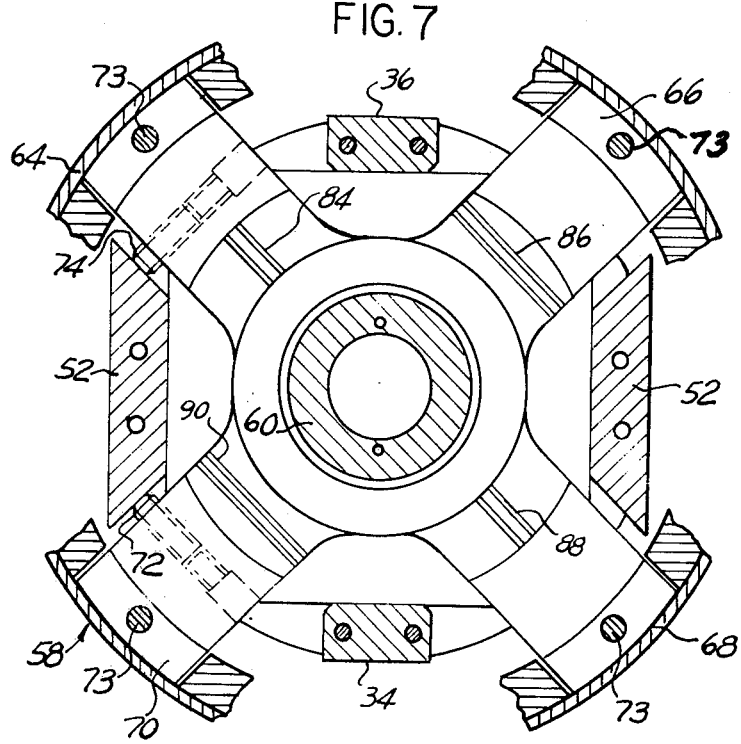
FIG. 7 is a view of the section 7—7 taken in FIG. 3.
Figure 8:
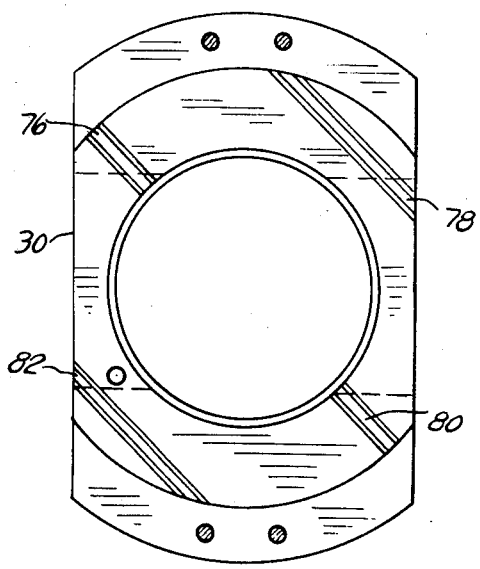
FIG. 8 is a partial view taken in the directions 8—8 in FIG. 3.

One of the interposed grid or index members, index pivot plate 50 abuts the grid V-bridge member 58 along surface 59 so as to be fixed relative thereto in the downward axial direction as viewed in FIG. 5 while relative lateral movement is prevented by virtue of its being received over boss 60 formed on the pivot plate 50. Rotative relative movement is prevented by set screws 72 and 74 engaging index post 52, which arrangement also provides a means for adjusting the rotative orientation between the index support structure 26 and the grid V-bridge member 58, for the purpose to be described below. Upward relative movement is prevented by virtue of an abutting engagement with a cross slide assembly 28 to be described herein, which engagement is maintained by being sandwiched between grid holder plate 30 and grid cap 32.

The cross slide assembly 28 includes a first set of parallel V-grooves 76, 78, 80 and 82 formed on the lower surface of the grid V-holder 30, and a second set of parallel V-grooves 84, 86, 88 and 90 formed on an upper surface of the grid V-bridge 58, these V-groove sets extending orthogonally to each other. Also included therein is an intermediate V-separator member 92 having upper V-grooves 94, 96, 90 and 100 parallel and juxtaposed V-grooves 76, 78, 80 and 82, and lower V-grooves 102, 104, 106 and 108 parallel and juxtaposed to V-grooves 84, 86, 88 and 90.

Cross slide assembly 28 further includes eight bearing balls 110, one disposed in each juxtaposed V-groove set, together with ball cages 112 and 114 provided to retain the balls 110.

Thus, the cross slide assembly 28 provides means whereby the grid support structure 24 is allowed to move in a plane parallel to the grid grating and index grating 22 in a fixed rotative orientation with respect to the index support structure 26 by means of the constraint exerted by the intermediate V-separator member 92 and the grid V-bridge 58.

Fine angular adjustment of the grid V-bridge 58 with respect to the index piece support structure 26 is provided by means of the set screws 72 and 74 engaging index post 52 to properly adjust the skew angle between the grating grid 22 and index grating 21 to produce the proper size Moire fringe pattern to match the photodetector size as well as to "fine tune" the phase angle for the reasons described in the above-identified patent application. It can be seen that by constraining the grid holder 30 by means of the cross slide assembly to remain in a fixed rotative orientation with respect to the grid V-bridge 58 rather than directly with respect to the index support structure 26 adjustment of the relative rotation position between the grid and index support structure is thereby enabled as described.

The final link in retaining these various elements in axial position with respect to each other while allowing the movement is provided by thrust bearing means 62 interengaging the other of said non-interposed grid or index members (grid cap 32) and the one of the interposed grid or index members (index pivot plate 50). Proper preloading of the thrust bearing 62 can be obtained by grinding of the posts 34 and 36.

It can be appreciated that this structure is quite compact and yet is quite effective at maintaining the proper angular relationship even when torsional loads are imposed on the probe tending to rotate these structures relative to each other about the probe axis.

Referring again to FIG. 2, the grid cap 32 is torsionally connected to coupling member 118 having a post portion 116 integral therewith and received in a bore 120 in the grid cap 32 by means of a spring loaded ball 122 carried in the grid cap 32 and engaging a slot 124 machined in the post portion 116. This arrangement constitutes a means providing an angular location of the probe tip 16 secured to the coupling member 118 as shown with respect to the two-axis transducer 18, while preventing the transmission thereto of significant torsional loads which would tend to disturb the alignment of the optical gratings described.

Coupling member 118 is located axially with respect to the housing 14 by means of a thrust plate 126 affixed to the probe housing 14 as shown disposed between a pair of thrust bearings 128 and 130 retained in a recess 132 formed by a cap plate 134 fixed to coupling member 118 and shoulder 136 formed theron. This arrangement (together with the ball 122 and slot 124 arrangement) constitutes means for supporting the probe tip assembly for frictionless movement parallel to the plane of movement of the two-axis transducer 18 while preventing the transmission of axial loads from the probe tip assembly 16 to the two-axis transducer 18, while accommodating the limited movement allowed by the cross slide arrangement 28.

The relatively large thrust bearings 128 and 130 support the weight of the probe tip assembly 16, so that the smaller thrust bearing 62 and the cross slide 28 are thus not loaded thereby further contributing to the frictionless movement of the probe tip assembly 16.

A self-centering bias arrangement is provided four springs 138 and four plungers 140 carried by the coupling 20 engaging a sidewall 142 of a bore 144 formed in the thrust plate 126.

Thus it can be seen that a compact and effective arrangement has been provided for maintaining the proper index and grid spatial relationship during the movement of the probe 10 and for coupling this structure to the probe tip to allow relatively frictionless movement thereof without allowing transmission of those forces tending to misalign this structure.

What is claimed is:

1. A probe support arrangement for a displacement transducer, said transducer including a grid grating and an index optical grating to be supported for relative movement in parallel planes while remaining in a fixed rotative orientation with respect to each other, the probe support arrangement including:
   a grid support structure including grid post elements and a pair of spaced grid members connected to each other by said grid post elements extending therebetween;
   an index support structure including index post elements and a pair of spaced index members connected to each other by said index post elements extending therebetween, one of each of said grid and index members interposed between the other pair of the grid or index members so that said grid and index support structures are linked to each other by said respective post elements;
   said grid and index gratings affixed to a respective one of opposing surfaces formed on one of an interposed grid or index members and one one of a non-interposed grid or index members so that said grid and index gratings are in juxtaposition with respect to each other, a grid V-bridge member secured so as to be stationary with respect to said probe and extending between said interposed grid and index members, one of said interposed grid or index members abutting said grid V-bridge member and fixed thereto;
   a cross slide assembly including cross slide bearing means interposed between the other of said interposed grid or index members and abutting said grid V-bridge member providing limited relative movement between said other of said grid or index members and said grid V-bridge in a plane parallel to said grid and index grating while maintaining a fixed rotative orientation therebetween;
   thrust bearing means interengaging the other of said noninterposed grid or index members and said one of said interposed grid or index members whereby in cooperation with said cross slide bearing means relative movement of said grid and index support structures in directions transverse to said plane is prevented while allowing said movement in said parallel plane;
   whereby said limited movement is accommodated while said index and grid supports and said grid V-bridge are thereby maintained position with respect to each other.

2. The probe support arrangement of claim 1 further including means for adjusting the rotative orientation between said one of said grid or index members abutting said grid V-bridge member and said grid V-bridge member.

3. The support arrangement of claim 1 further including a probe tip assembly and means coupling said probe assembly to said other of said non-interposed grid or index members grid or index and further including thrust bearing support means for said probe assembly providing for movement thereof in a plane parallel to said plane of movement provided by said cross slide means.

4. The support arrangement of claim 3, wherein said coupling means transmits movements of said probe assembly to said other of said grid or index members only in directions parallel to said plane of movement provided by said cross slide means.

* * * * *

UNITED STATES PATENT OFFICE
CERTIFICATE OF CORRECTION

Patent No. 3,991,477            Dated November 16, 1976

Inventor(s) R.B. Zipin, J.E. Hart, J.W. Grass

It is certified that error appears in the above-identified patent and that said Letters Patent are hereby corrected as shown below:

Column 1, Line 17, change "More" to ---Moire---.

Column 6, Line 5, after the word "and" delete ---one---, (first occurence).

Signed and Sealed this

First Day of March 1977

[SEAL]

Attest:

RUTH C. MASON            C. MARSHALL DANN
*Attesting Officer*            *Commissioner of Patents and Trademarks*